United States Patent [19]

Satoh et al.

[11] Patent Number: 4,698,646
[45] Date of Patent: Oct. 6, 1987

[54] THERMAL TRANSFER RECORDING SYSTEM

[75] Inventors: Tsuyoshi Satoh, Tokyo; Tsutomu Mitsuishi, Kawasaki; Kenji Toyoda, Chigasaki; Kaoru Naito, Yokohama; Makoto Ogawa, Hiratsuka; Hiroshi Sato, Kodaira, all of Japan

[73] Assignee: Nippon Kogaku K. K., Tokyo, Japan

[21] Appl. No.: 4,285

[22] Filed: Jan. 6, 1987

Related U.S. Application Data

[63] Continuation of Ser. No. 772,709, Sep. 5, 1985, abandoned.

[30] Foreign Application Priority Data

Sep. 14, 1984 [JP] Japan .................................. 59-192795
Sep. 14, 1984 [JP] Japan .................................. 59-192796
Sep. 14, 1984 [JP] Japan .................................. 59-192798

[51] Int. Cl.⁴ ............................................ G01D 15/10
[52] U.S. Cl. ................................ 346/76 PH; 346/105; 346/106; 400/120; 400/208
[58] Field of Search ................ 346/76 PH, 76 R, 105, 346/106, 136; 400/120, 205, 205.1, 207, 208, 599, 599.1, 624; 271/9, 145, 165

[56] References Cited

U.S. PATENT DOCUMENTS 4,504,837  3/1985  Toyana et al. .................. 346/76 PH
4,527,172  7/1985  Nagashima .......................... 400/624

Primary Examiner—Arthur G. Evans
Attorney, Agent, or Firm—Shapiro and Shapiro

[57] ABSTRACT

A thermal transfer recording system comprising a supply cartridge including a case and an image forming sheet and an ink sheet housed in the case, taking-out means for taking out the image forming sheet and the ink sheet from the supply cartridge and print means including a thermal head for printing on the taken-out image forming sheet by the taken-out ink sheet.

22 Claims, 14 Drawing Figures

THERMAL TRANSFER RECORDING SYSTEM

This is a continuation application of Ser. No. 772,709 filed Sept. 5, 1985, now abandoned.

BACKGROUND OF THE INVENTION

1. Field of the Invention

The present invention relates to a thermal transfer recording system.

2. Description of the Prior Art

An extensive study has been made on a methods for reproducing an image in a form of a hard copy such as a photograph from an electrical image signal derived from a video camera, a still camera, television, video disk or a facsimile machine. One of the important methods is a thermal transfer recording method.

In the thermal transfer recording method, a thermo-sensing recording paper is applied to a thermal head having a group of heat generating dots arranged at 4–10 dots/mm and a two-dimensional image is printed on the recording paper based on an image signal sent to the thermal head one line at a time. The thermo-sensitive record paper may be a thermosensitive coloring paper or a composite sheet of an image forming sheet and an ink sheet.

The recorder of this method usually includes a thermal head having a group of heat generating dots arranged one-dimensionally and a group of electrode pairs for energizing the dots, a platen for urging the composite sheet of the image forming sheet and the ink sheet to the thermal head, an image forming sheet supply unit, an image forming sheet feed roller, an ink sheet supply unit, a take-up roller for taking up the used ink sheet, motors for driving the rollers and an electrical circuit.

In the prior art machine, the ink sheet supply unit and the image forming sheet supply unit are separately provided. Thus, when the sheets accommodated therein have been exhausted and the unit is to be replaced by a new one, such replacement must be done at two locations. The replacement work is troublesome because the hands of an operator may be contaminated or the ink sheets may be contaminated. It is hard for the operator to conduct such replacement at two locations.

SUMMARY OF THE INVENTION

It is an object of the present invention to provide a novel thermal transfer recording system which facilitates replacement of ink sheets and image forming sheets.

In the present system, there is provided a cassette or cartridge which accommodates ink sheets and image forming sheets in one casing.

In one aspect of the present invention, the cassette or cartridge is constructed such that the ink sheets used in the previous record operation are again accommodated in the housing.

In the present system, ink sheets and image forming sheets of new structure are provided.

In a preferred aspect of the present invention, the ink sheet comprises a base sheet and an ink layer formed thereon. In order to obtain a full-color record, yellow, magenta, cyan and black as required ink regions are sequentially arranged longitudinally of the base sheet, and the ink sheet has three or four ink regions from one unit to correspond to one image forming sheet. In one unit of the ink sheet, it is preferable to form a margin area of substantially the same size as the image forming sheet after the last ink region. The image forming sheet is overlayed on the first ink region of the unit ink sheet having the margin area to form a composite sheet, and a number of such composite sheets are serially jointed to form a continuous sheet. If the sheet is continuous, subsequent composite sheets can be continuously taken out if the first composite sheet is taken out. The continuous sheet including a number of composite sheets is preferably accommodated in a casing in a zigzag folded condition.

The continuous sheet has preferably low strength lines (lines of weakness) crossing the sheet at a constant interval to facilitate cutting of the sheet by each unit. The low strength lines may be widthwise perforated lines or notches, thicknesswise scribe lines, low strength material lines or joints of pre-cut sheets.

In other aspect of the present invention, the cassette or cartridge has a casing including an image sheet housing and an ink sheet housing, the image forming sheet housing houses the unit image forming sheets in stacks and said ink sheet housing houses a web-like rolled ink sheet, and the casing has a port from which the unit image forming sheet and the web-like ink sheet can be taken out in the same direction.

DESCRIPTION OF THE PREFERRED EMBODIMENTS

Figure 1:
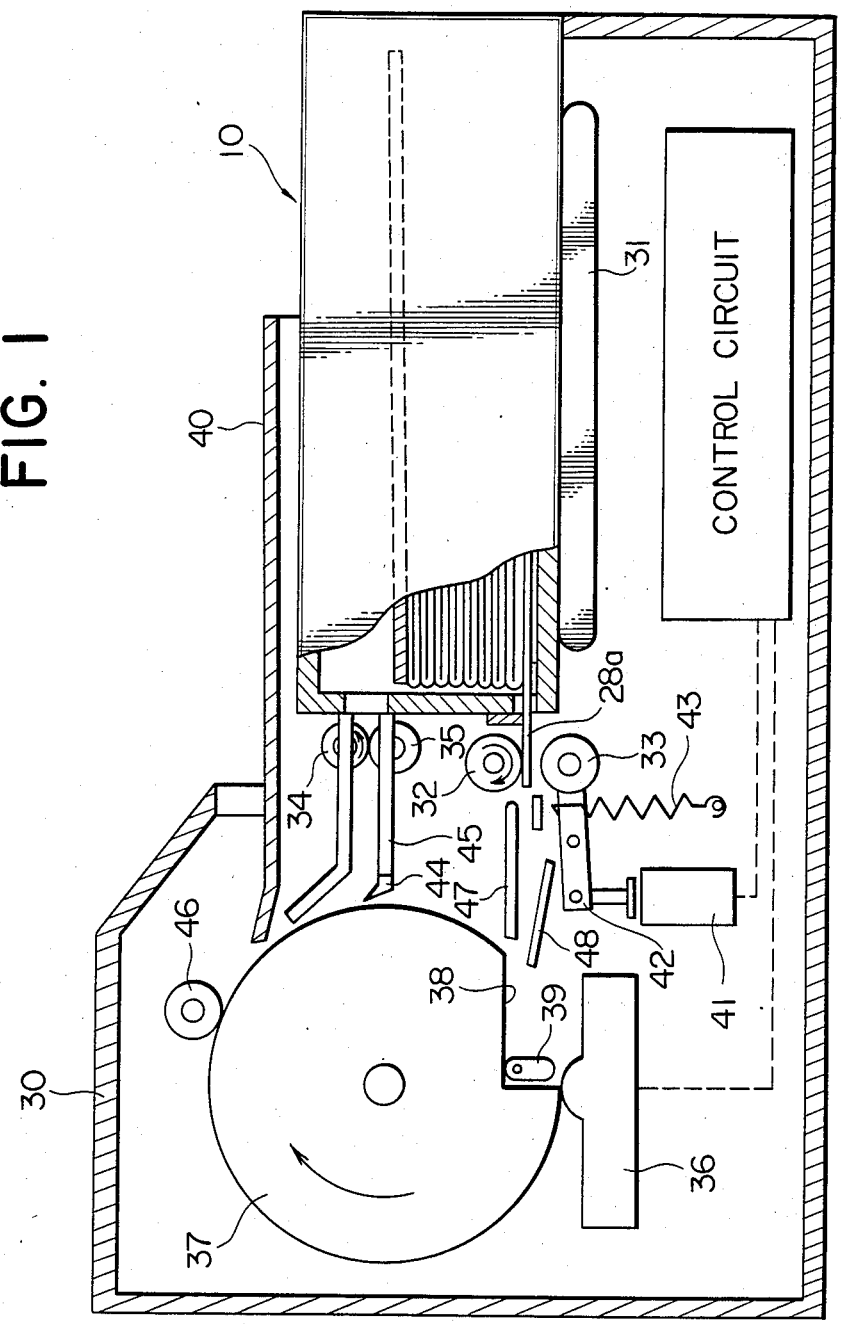
FIG. 1 is a sectional view of one embodiment of a thermal transfer recorder of the present invention.

FIG. 1 shows a schematic view of a thermal transfer recorder. A cartridge 10 which houses thermal recording sheets is loaded to a housing 30. The cartridge 10 is inserted along a guide rail 31 from an opening on a right side of the housing. Around the cartridge, a feed roller 32 and a backup roller 33 are arranged to face a take-out port for the record sheet, and a feed roller 34 and a backup roller 35 are arranged to face a recovery port for the used ink sheet. The feed roller 32 is driven by a stepping motor (not shown) and the feed roller 34 is driven with a platen 37, in directions shown by arrows.

The platen 37 is rotated by a stepping motor (not shown) in the direction shown by the arrow. The platen 37 has a notch 38 in which a sheet holder 39 is provided. A thermal head 36 is arranged opposite to the platen 37 and a plate 40 for receiving the image forming sheets fed through the platen is arranged above the cartridge 10.

Figure 2:
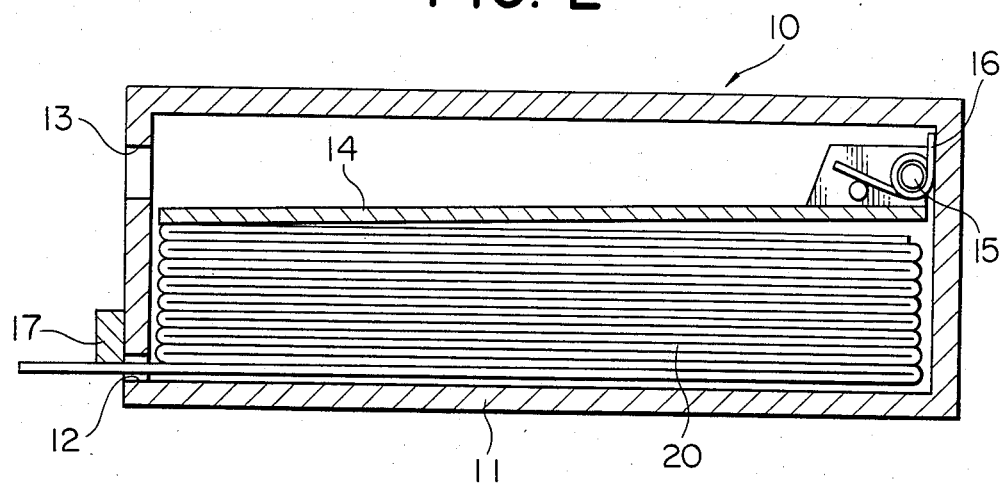
FIG. 2 is a sectional view of a thermal recording sheet cartridge.

The cartridge 10 is constructed as shown in FIG. 2. A take-out port 12 for the record sheets 20 and a recovery port 13 for the used ink sheets are formed in the casing 11 of the cartridge. An internal space of the cartridge in vertically divided by a separation wall 14, and the record sheets 20 are housed in the lower space. The separation wall 14 is swingably supported by a shaft 15 to the casing 11 and biased counterclockwise by a coiled spring 16. Accordingly, as the number of record sheets 20 decreases, the separation wall 14 descends and the upper space increases. The used ink sheets are housed in the upper space. An elastic shuttling member 17 is fixed to the exterior of the take-out port 12 in order to prevent the record sheets in a stacked condition from being fed from the take out port 12.

Figure 3A:
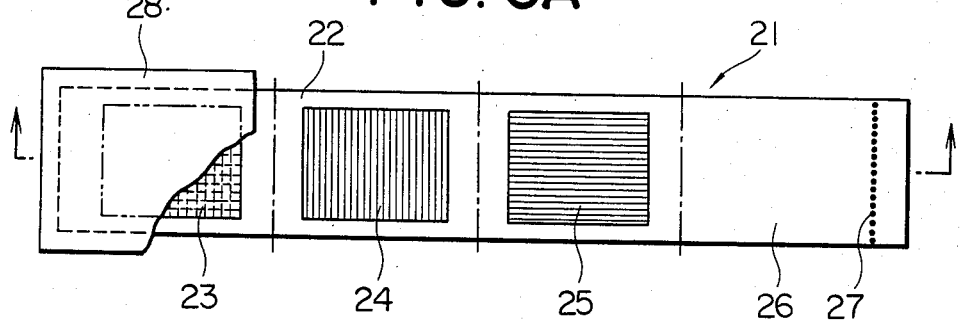
FIG. 3A is a plan view of a composite sheet which is a unit of a thermal recording sheet.
Figure 3B:
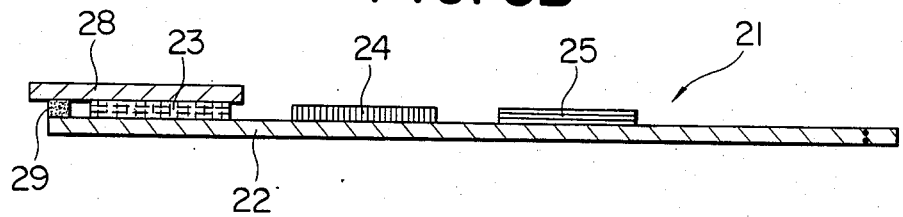
FIG. 3B is a sectional view taken in a direction of an arrow shown in FIG. 3A.

A structure of the thermal recording sheet 20 will now be explained. A full-color ink sheet shown in FIGS. 3A and 3B has a support sheet 22 and yellow, magenta and cyan ink regions 23, 24 and 25 sequentially formed on the support sheet 22. A margin area 26 is formed after the cyan region 25. Folding lines shown by chain lines are formed between the yellow region 23 and the magenta region 24, between the magenta region 24 and the cyan region 25, and between the cyan region 25 and the margin area 26 so that the sheet can be folded in a zigzag form along the lines. The three ink regions and the margin area form one unit and a perforation line (line of weakness 27 is formed after the margin area.

The image forming sheet 28 is overlaid on the yellow ink region 23 of the ink sheet, and the image forming sheet 28 and the support sheet 22 are bonded through a lead paper 29 at a leading edge. The lead paper 29 is weakly bonded to the image forming sheet 28 by bonding material and the lead paper 29 is strongly bonded to the support sheet 22 by bonding material.

Figure 4:
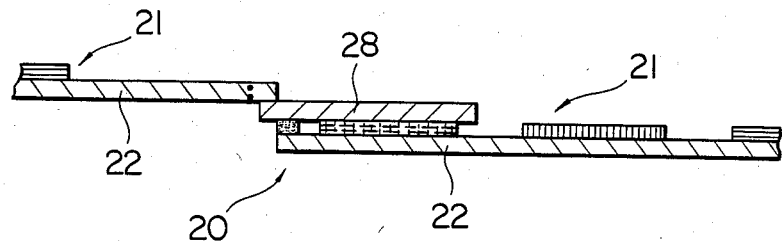
FIG. 4 is a sectional view showing a portion of the thermal recording sheet.

The ink sheet having the three color ink regions and one image forming sheet 28 form one unit of composite sheet 21. As shown in FIG. 4, a trailing edge back side of the support sheet 22 of the preceding sheet and a leading edge front side of the image forming sheet 28 of the succeeding sheet are strongly bonded together so that a number of composite sheets are connected in series to form the thermal recording sheet 20.

Figure 5:
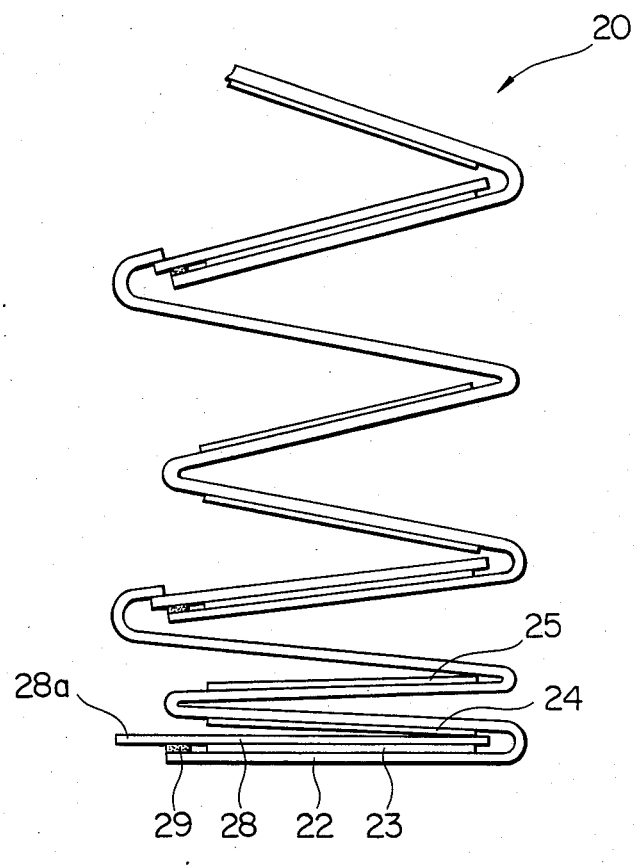
FIG. 5 shows a folded thermal recording sheet.

The recording sheet 20 is folded in zigzag form along the folding lines and the perforation lines with the lowermost layers being at the leading edge in a manner to prevent direct contact of the ink regions as shown in FIG. 5, and the folded sheet is housed in the lower space of the cartridge 10. A leader 28a is formed at a leading edge of the image forming sheet 28 of the lowermost layer of FIG. 5 to facilitate taking-out from the cartridge. The leader 28a projects outwardly of the take-out port 12 of the cartridge.

The operation of the thermal transfer recording system is now explained.

When a print button (not shown) of the recorder is depressed, a control circuit energizes a solenoid 41 to rotate a lever 42 counterclockwise so that a backup roller 33 is raised. A feed roller 32 driven by a stepping motor is rotated by a predetermined angle and the leader 28a of the record sheet 20 is taken out along guides 47 and 48 until it abuts against the notch 38 of the platen 37. Then, the rotation of the feed roller 32 stops and the solenoid 41 is deenergized so that the backup roller 33 descends by a tension force of the tension spring 43. The paper holder 39 of the platen 37 is rotated by a rotary solenoid (not shown) to hold the leader 28a to the platen 37. As the platen starts to rotate by the stepping motor, the first composite sheet is taken out, and when the first print line of the overlaid ink sheet and image forming sheet reaches a position to face the thermal head 36, the rotation of the platen is stopped. Currents are supplied from the control circuit to the thermal head in accordance with the input image signal so that the heat generating elements generate heat to make printing in yellow.

After the printing of the first print line, the platen is rotated by one line pitch and the next print line is printed. This operation is repeated until the last print line is printed. In this manner, a yellow monochromatic image is formed on the image forming sheet.

As the platen is further rotated, the lead paper 29 abuts against the blade 44. Since the lead paper 29 is weakly bonded to the image forming sheet 28, the lead paper 29 is stripped off together with the ink sheet so that the ink sheet travels on the guide plate 45 and pinched by the feed roller 34 and the backup roller 35 and goes into the upper space of the cartridge.

The image forming sheet 28 is then rotated along the platen 37 and brought to the position to face the thermal head 36. Under this condition, the magenta ink region 24 on the support sheet 22 faces the thermal head 36 and the image forming sheet 28 is overlaid on the magenta ink region so that a magenta monochromatic image is formed in superposition to the yellow image.

After the magenta image printing, the platen is further rotated and the image forming sheet 28 is brought to the position to face the thermal head, and it is overlaid on the cyan ink region 25. Thus, the cyan image is superimposed on the magenta image.

In this manner, the full-color image is formed on the image forming sheet 28. As the platen is further rotated, the image forming sheet 28 is again brought to the position to face the thermal head and it is overlaid on the margin area 26. The platen is rotated without printing and the leading edge of the next composite sheet is projected from the take-out port 12.

The solenoid 41 is again energized to raise the backup roller 33 to hold the composite sheet between the backup roller 33 and the feed roller 32. At this time, the feed roller 32 is braked to prevent rotation. Thus, the composite sheet is fixed between the two rollers 32 and 33.

As the platen 37 and the feed roller 34 further rotate, the first ink sheet is pulled and it is torn off along the perforation line 27 at the trailing edge of the first ink sheet, and the first used ink sheet is housed in the used ink sheet housing space without taking out the composite sheet from the cartridge. The image forming sheet singly wrapped around the platen is released from the paper holder 39 when the leading edge of the image forming sheet goes beyond the pressure roll 46 during the further rotation of the platen. As a result, the leading edge of the image forming sheet floats up from the surface of the platen by the rigidity of the image forming sheet and rides on the receiving plate 40. The platen stops its rotation when the paper holder 39 come to the thermal head so that the initial position of FIG. 1 is reproduced.

An embodiment in which the ink sheet and the image forming sheet are separately formed and housed in the same cartridge is explained.

Figure 6:
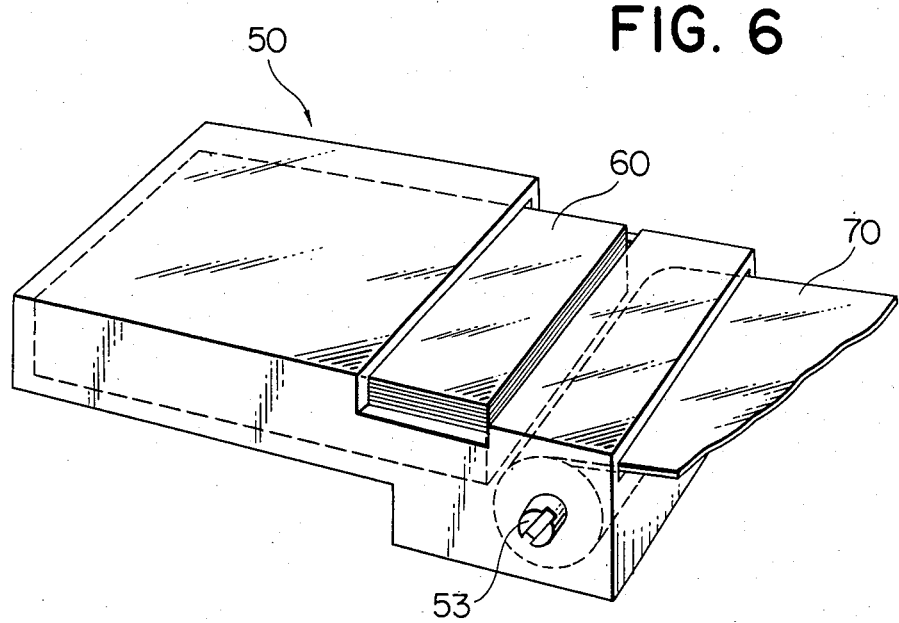
FIG. 6 is a perspective view of a cartridge in another embodiment of the present invention.
Figure 7:
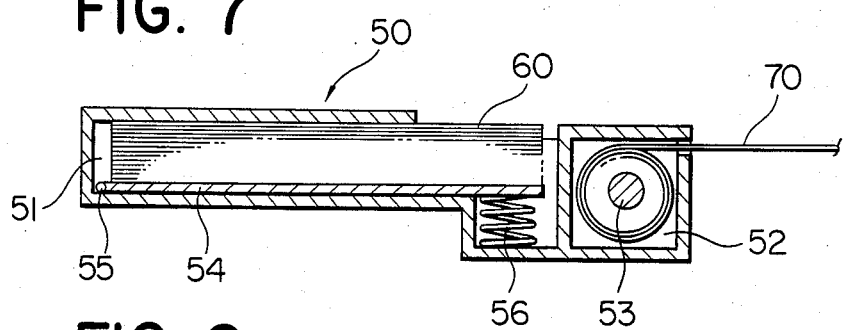
FIG. 7 is a sectional view of FIG. 6.

In FIGS. 6 and 7, an interior of a cartridge 50 is divided into an image forming sheet housing 51 and an ink sheet housing 52. Both housings have take-out ports formed to allow taking-out of the image forming sheet 60 and the ink sheet 70 in the same direction.

The housing 51 houses a plurality of image forming sheets of a predetermined size in a stacked condition, and the housing 52 houses a web-like ink sheet wound on a rotatable shaft 53.

The housing 51 has a bottom plate 54 which is pivotable around a hinge 55 and biased upward by a spring 56.

Figure 8:
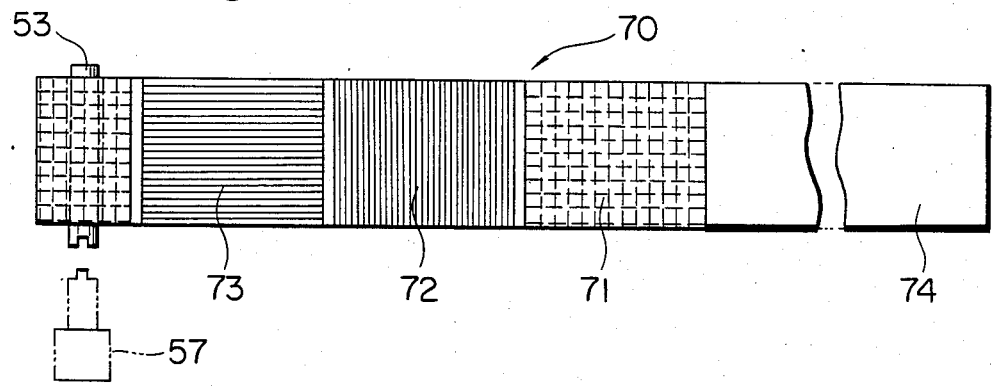
FIG. 8 is a plan view of an ink sheet.

As shown in FIG. 8, the ink sheet 70 has three color ink regions 71, 72 and 73 of yellow, magenta and cyan which are slightly smaller in size than the image forming sheet 60 formed on the web-like support sheet. The leading edge of the ink sheet has a leader 74 of a relatively high rigidity. The leader has a function to facilitate chucking by the ink take-up roller of the recorder when the cartridge is loaded to the recorder.

The web-like ink sheet 70 is wound on the shaft 53 which is rotatably mounted to the cartridge casing. A coupling to transmit a rotational force from an external drive unit 57 is mounted at one end of the shaft 53.

The function of the cartridge is now explained with reference to FIGS. 9 to 13.

Figure 9:
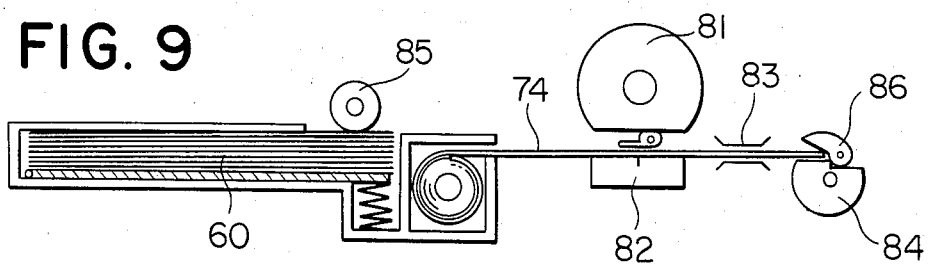
FIGS. 9 to 13 show a process of thermal transfer when the cartridge of FIG. 6 is used.

When the cartridge 50 is loaded to the recorder, the coupling formed at the end of the shaft 53 on which the web-like ink sheet 70 is wound fits to the rotating shaft of the drive unit 57 of the recorder so that the leader 74 at the leading edge of the ink sheet is taken out. The leader passes through the clearance between the platen 81 and the thermal head 82, and the guide member 83 and reaches the take-up roller 84. The uppermost image forming sheet 60 exposed to the take-out port abuts against the feed roller 85 and is pressed thereto. This is shown in FIG. 9.

Figure 10:
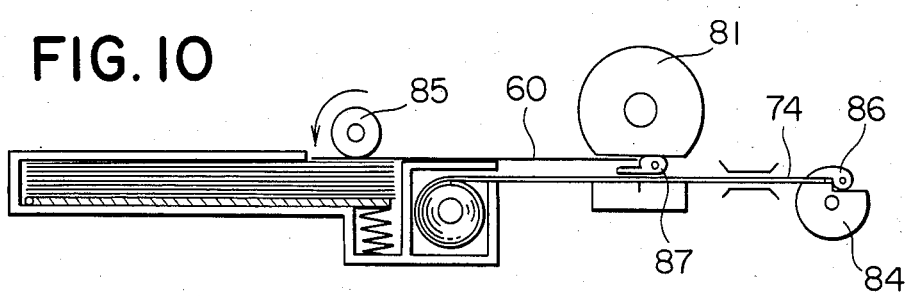

As the switch of the recorder is turned on, the chuck 86 of the take-up roller 84 holds the end of the leader 74, and the feed roller 85 rotates to feed out the uppermost image forming sheet 60 from the cassette. As the leading edge of the image forming sheet abuts against the chuck 87 of the platen 81, the feed roller 85 stops to rotating. Since the feed roller 85 is coupled to a feed roller shaft (not shown) by a one-way clutch, it is free to rotate in the take-up direction of the image forming sheet. This is shown in FIG. 10.

Figure 11:
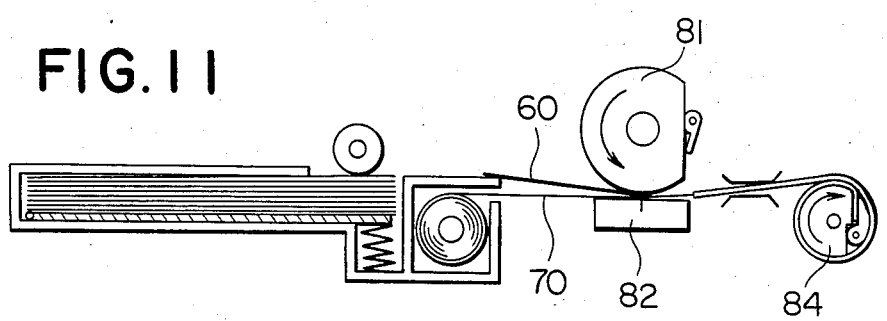
Figure 12:
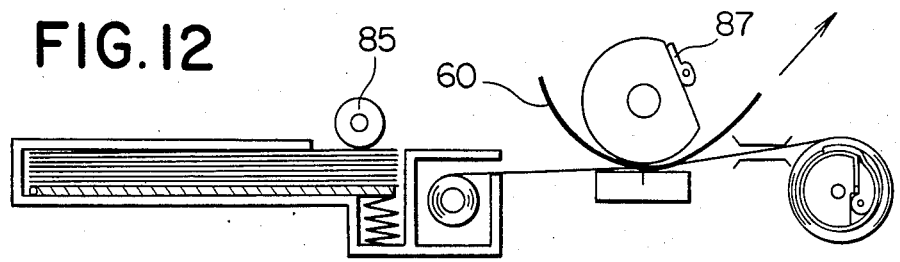
Figure 13:
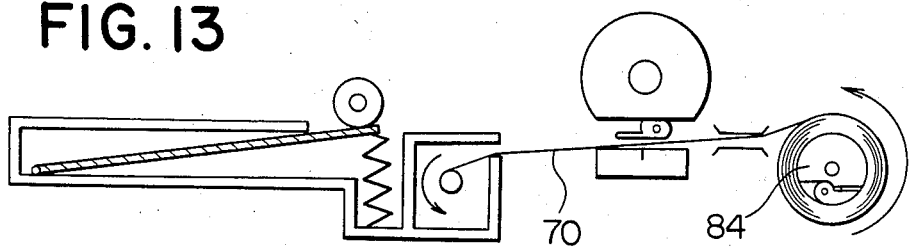

Then, the chuck 87 holds the leading edge of the image forming sheet 60, the take-up roller 84 rotates to take up the leader 74 and the rotation of the platen 81 is stopped slightly before the leader 74 has been taken up. Then, as the periphery of the platen comes to face the thermal head 82, the first yellow ink region and the image forming sheet 60 are overlapped and strongly urged to the thermal head by the platen. This is shown in FIG. 11. The yellow monochromatic image is formed by the yellow ink on the image forming sheet 60 in the same manner as the previous embodiment.

As the platen 81 is further rotated, the flat surface portion of the platen comes to the position to face the thermal head so that a gap is formed between the platen and the thermal head. Under this condition, the rotation of the take-up roller 84 is stopped until the peripheral surface of the platen comes to the position to face the thermal head.

As the platen further rotates and the peripheral surface of the platen faces the thermal head, a magenta ink region is overlaid on the image forming sheet having the yellow monochromatic image formed thereon. Thus, the magenta monochromatic image is superimposed on the yellow monochromatic image.

Similarly, a cyan monochromatic image is overprinted. In this manner, the full-color image is formed on the image forming sheet.

In the printing by the cyan ink, the chuck 87 opens when the chuck 87 comes up before the printing of the last print line is finished. As a result, the leading edge of the image forming sheet 60 goes off the platen surface by the rigidity of the image forming sheet and it is fed in the direction shown by an arrow in FIG. 12 as the platen rotates.

As the platen further rotates after the end of the printing of the last print line, the flat surface portion of the platen faces the thermal head and a gap is formed between the platen and the thermal head. Thus, an initial position similar to that of FIG. 9 is resumed.

When a print command is again issued, the feed rller 85 is rotated to feed out the next image forming sheet from the cassette to take the position shown in FIG. 10.

The number of image forming sheets in the cassette corresponds to the number of units of the web-like ink sheet. Thus, when the image forming sheets have been exhausted, the end of the web-like ink sheet is reached.

The used web-like ink sheet 70 wound on the roller 84 is rewound into the cartridge by the reverse rotation of the shaft 53 by the drive unit 57. After rewinding, the cartridge is exchanged with a new one.

We claim:

1. A thermal transfer recording system comprising:
 a housing;
 a supply cartridge removably mounted in said housing and including an image forming sheet, an ink sheet and a case member containing therein said image forming sheet and said ink sheet, said case member having opening means through which said image forming sheet and said ink sheet are passed;
 means for taking-out said image forming sheet and said ink sheet from said case member through said opening means;
 print means having a thermal head for printing on said image forming sheet taken-out from said case member by using said ink sheet taken-out from said case member; and
 means for feeding said ink sheet used by said print means into said case member through said opening means.

2. A thermal transfer recording system according to claim 1 wherein said opening means has a take-out port provided for taking-out said image forming sheet and said ink sheet from said case member, and a recovery port provided for recovering said ink sheet into said case member.

3. A thermal transfer recording system according to claim 1 wherein said case member has a first space to house therein said image forming sheet and said ink sheet and a second space for housing therein the ink sheet used by said print means.

4. A thermal transfer recording system according to claim 3 wherein said case member includes a separation wall between the first space and the second space, and means for moving said separation wall to increase the second space as the image forming sheet and the ink sheet are taken out.

5. A thermal transfer recording system according to claim 4 wherein said moving means includes means for biasing said separation wall toward said first space.

6. A thermal transfer recording system according to claim 1 wherein said case member has a first space for housing therein the image forming sheet and a second space for housing therein the ink sheet, and said opening means comprises first and second transfer ports connected to said first and second spaces respectively, said taking-out means takes out said image forming sheet from said first space through said first transfer port and said ink sheet from said second space through said second transfer port, and said feeding means feeds the ink sheet used by said print means into said second space through said second transfer port.

7. A thermal transfer recording system comprising:
a housing;
a supply cartridge removably mounted in said housing and including a thermal transfer recording medium and a case member containing therein said recording medium, said case member having opening means through which said recording medium is passed;
said recording medium including a plurality of image forming sheets and an ink sheet member, said ink sheet member having a base sheet and corresponding plural sets of ink zones sequentially arranged in a linear direction on said base sheet;
means for taking-out said recording medium through said opening means;
print means having a thermal head for printing on said image forming sheet taken-out from said case member by using said ink sheet member taken-out from said case member; and
means for feeding said ink sheet member used by said print means into said case member through said opening means.

8. A thermal transfer recording system according to claim 7 wherein said base sheet of said ink sheet member is formed in a strip shape elongated in said linear direction and each set of said ink zones includes a plurality of ink areas sequentially arranged in said linear direction, and said ink areas have colors different from each other.

9. A thermal transfer recording system according to claim 8 wherein a margin area of substantially the same size as said image forming sheet is provided on said base sheet at intervals corresponding to said ink zones.

10. A sheet supply cartridge for use in a thermal transfer recorder having a thermal head, comprising:
a housing having a wall member dividing the housing into first and second spaces, and first and second openings connected to said first and second spaces respectively;
a recording medium provided in said first space and including a plurality of sheet units;
each of said sheet units comprising a base sheet formed in a strip shape elongated in a linear direction, a plurality of ink regions having thermo-sensitive inks applied on said base sheet at predetermined intervals longitudinally of said base sheet, and an image forming sheet disposed on said base sheet at a position covering one of said ink regions; and
one end portion of the base sheet of each sheet unit being connected with another sheet unit, and each base sheet having a line of weakness crossing said linear direction adjacent said one end portion.

11. A sheet supply cartridge according to claim 10 wherein said base sheet has a margin area of substantially the same size as said image forming sheet at a position adjacent said end portion.

12. A sheet supply cartridge for use in a thermal transfer recorder having a thermal head, comprising:
a housing; and
a recording medium provided in said housing and including a plurality of image forming sheets and an ink sheet member;

said ink sheet member comprising a base sheet formed in a strip shape elongated in a linear direction, plural sets of ink areas applied on said base sheet at predetermined intervals longitudinally of said base sheet, and margin areas provided at the intervals of said sets of ink areas, respectively, said ink areas having thermo-sensitive inks applied on said base sheet in a direction longitudinally of said base sheet, and each of said ink areas and said margin areas having substantially the same size as one of said image forming sheets.

13. A sheet supply cartridge according to claim 12 wherein said ink areas in each of said sets have colors different form each other.

14. A sheet supply cartridge according to claim 12 wherein said housing has a wall member dividing the housing into a first space in which said image forming sheets are contained and a second space in which said ink sheet member is contained.

15. A thermal transfer recording medium comprising:
a base sheet formed in a strip shape elongated in a linear direction;
a plurality of ink regions having thermo-sensitive inks applied on said base sheet at predetermined intervals longitudinally of said base sheet; and
an image forming sheet disposed on said base sheet at a position covering one of said ink regions;
said base sheet having a line of weakness crossing said linear direction adjacent one end portion of the base sheet.

16. A thermal transfer recording medium according to claim 15 wherein said base sheet has a margin area of substantially the same size as said image forming sheet at a position adjacent said end portion.

17. A sheet supply cartridge for use in a thermal transfer recorder having a thermal head, comprising:
a housing having a space and an opening connected to said space;
a recording medium provided in said space and including a plurality of sheet units;
each of said sheet units comprising a base sheet formed in a strip shape elongated in a linear direction, a plurality of ink regions having thermo-sensitive inks applied on said base sheet at predetermined intervals longitudinally of said base sheet, and an image forming sheet disposed on said base sheet; and
one end portion of the base sheet of each sheet unit being connected with another sheet unit, and each base sheet having a line of weakness crossing said linear direction adjacent said one end portion.

18. A sheet supply cartridge according to claim 17 wherein said housing includes first and second spaces, and first and second openings connected to said first and second spaces, respectively, and wherein said recording medium is provided in said first space.

19. A sheet supply cartridge according to claim 18 wherein said sheet units are taken out through said first opening and wherein said housing further includes a wall member between said first and second spaces and means for moving said wall member to increase said second space as said sheet units are taken out through said first opening.

20. A sheet supply cartridge according to claim 17 wherein said base sheet has a margin area of substantially the same size as said image forming sheet at a position adjacent said end portion.

21. A thermal transfer recording medium comprising:

a base sheet formed in a strip shape elongated in a linear direction;
a plurality of ink regions having thermo-sensitive inks applied on said base sheet at predetermined intervals longitudinally of said base sheet; and
an image forming sheet disposed on said base sheet;
said base sheet having a line of weakness crossing said linear direction adjacent one end portion of the base sheet.

22. A thermal transfer recording medium according to claim 21 wherein said base sheet has a margin area of substantially the same size as said image forming sheet at a position adjacent said end portion.

* * * * *